(12) United States Patent
Fagerlund et al.

(10) Patent No.: US 7,766,045 B2
(45) Date of Patent: Aug. 3, 2010

(54) FLUID PRESSURE REDUCTION DEVICE FOR HIGH PRESSURE-DROP RATIOS

(75) Inventors: Allen C. Fagerlund, Marshalltown, IA (US); Frederick W. Catron, Gladbrook, IA (US); Charles L. DePenning, Marshalltown, IA (US); Paul T. Alman, Marshalltown, IA (US); Ted D. Grabau, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1038 days.

(21) Appl. No.: 11/461,218

(22) Filed: Jul. 31, 2006

(65) Prior Publication Data

US 2008/0023086 A1 Jan. 31, 2008

(51) Int. Cl.
F15D 1/02 (2006.01)
F16K 3/24 (2006.01)

(52) U.S. Cl. .............................. 138/42; 138/40; 138/37; 137/625.33; 137/625.3; 251/127

(58) Field of Classification Search .................... 138/40, 138/42; 137/625.3, 625.33; 251/127
See application file for complete search history.

(56) References Cited

U.S. PATENT DOCUMENTS

| | | | | |
|---|---|---|---|---|
| 3,780,767 A | * | 12/1973 | Borg et al. | 137/625.3 |
| 3,941,350 A | * | 3/1976 | Kluczynski | 251/127 |
| 3,971,411 A | | 7/1976 | Baumann | |
| 4,041,982 A | | 8/1977 | Lindner | |
| 4,079,754 A | * | 3/1978 | Porter | 138/42 |
| 4,105,048 A | * | 8/1978 | Self | 138/42 |
| 4,125,129 A | | 11/1978 | Baumann | |
| 4,267,045 A | * | 5/1981 | Hoof | 210/322 |
| 4,456,033 A | | 6/1984 | Kay et al. | |
| 5,732,738 A | * | 3/1998 | Graham | 137/625.33 |
| 5,769,122 A | * | 6/1998 | Baumann et al. | 137/625.33 |

(Continued)

FOREIGN PATENT DOCUMENTS

FR 2.187.083 1/1974

(Continued)

OTHER PUBLICATIONS

Severe Service Journal, Fisher Controls International, Inc., and Rosemount, Inc., vol. 3, Issue 6, Jul. 2001.

(Continued)

Primary Examiner—Patrick F Brinson
(74) Attorney, Agent, or Firm—Marshall, Gerstein & Borun LLP (57) ABSTRACT

A fluid pressure reduction device comprises two or more stackable annular plates. Each disk having a perimeter and a hollow center aligned along a longitudinal axis when the annular plates are stacked one on top of the other. Each disk further comprising at least one inlet flow sector having an inlet flow stage for defining a first inlet area and a first outlet area, and at least one outlet flow sector having an outlet flow stage defining a second inlet area and a second outlet areas wherein the ratio of the second inlet area to the second outlet area is predetermined to define a backpressure at the outlet flow stage to provide a sub-sonic fluid flow at the perimeter.

17 Claims, 4 Drawing Sheets

U.S. PATENT DOCUMENTS

| | | | |
|---|---|---|---|
| 5,819,803 A * | 10/1998 | Lebo et al. | 138/42 |
| 5,941,281 A * | 8/1999 | Baumann et al. | 137/625.33 |
| 6,026,859 A * | 2/2000 | Wears et al. | 137/625.33 |
| 6,095,196 A | 8/2000 | McCarty et al. | |
| 6,244,297 B1 | 6/2001 | Baumann | |
| 6,343,672 B1 | 2/2002 | Petela et al. | |
| 6,615,874 B2 * | 9/2003 | Thurston et al. | 138/42 |
| 6,718,633 B1 | 4/2004 | Glenn et al. | |
| 2003/0136454 A1 | 7/2003 | Thurston et al. | |

FOREIGN PATENT DOCUMENTS

| | | |
|---|---|---|
| WO | WO 97/48930 | 12/1997 |
| WO | WO 99/39122 | 8/1999 |
| WO | WO 00/57091 | 9/2000 |

OTHER PUBLICATIONS

Severe Service Journal, A publication of the Severe Service Team at Fisher Controls, Fisher Controls International, Inc., vol. 1, Issue 1, Nov. 2001.

International Search Report and Written Opinion for PCT/US2007/014521, dated Dec. 20, 2007.

* cited by examiner

FLUID PRESSURE REDUCTION DEVICE FOR HIGH PRESSURE-DROP RATIOS

FIELD OF THE INVENTION

This disclosure relates generally to fluid pressure reduction devices, and more particularly, to an improvement of fluid pressure reduction devices used in process control applications having high pressure-drop ratios.

BACKGROUND OF THE INVENTION

In the process control industry many process applications may produce unacceptable levels of aerodynamic noise. For example, modern power generating stations typically use steam turbines to generate power. The steam turbines require periodic maintenance and it is generally known to be more economical to continue steam generation during turbine maintenance than to completely shut down the plant. During turbine maintenance, a series of supplemental piping and valves, known as a turbine bypass system, circumvent the steam turbine and redirect the steam to a recovery circuit where the steam is repetitively recycled. It is understood that the process conditions within recovery circuit produce high temperatures and large pressure differentials (e.g., 1200° F. and 500 psid) that may create damaging vibration and high levels of noise within the system as steam is redirected from the turbine. To prevent these conditions from damaging the steam recovery circuit components, steam temperature and steam pressure must be reduced prior to entering the system.

Typically, to control the steam temperature and steam pressure prior to entering the recovery system, fluid pressure reductions devices, commonly referred to as diffusers or spargers, are used. Diffusers are aerodynamically restrictive devices that reduce fluid pressure and temperature by transferring and/or absorbing fluid energy contained in the bypass steam. Typical diffusers are constructed from a hollow housing including a series of passageways throughout the housing walls that connect multiple inlet ports along the interior walls to outlets along the exterior surface of the diffuser as described in U.S. Pat. No. 5,769,122 and U.S. Pat. No. 6,244,297 and are hereby expressly incorporated by reference. Generally, the passageways within these devices separate and divide the incoming fluid into progressively smaller fluid jets that subsequently reduce the pressure and the temperature of the incoming fluid.

Similarly, in control valve applications, valve trim, such as cages, may also encounter harsh conditions. For example, in Liquid Natural Gas (LNG) distribution applications, large compressors are used to pressurize the natural gas to liquid phase prior to introduction into a distribution pipeline. It is known that during compressor operation a potentially destructive condition known as "surge" may occur. The surge point of the compressor is generally defined as the operating point where the maximum pressure at minimum stable flow can be achieved for a given compressor speed.

Operation of the compressor at or below the surge point may cause unstable operation that may cause compressor surge to occur. For example, in normal operation as gas flow through the compressor system decreases, the fluid pressure increases to maintain flow, but near the surge point, the compressor can not impart enough momentum in the gas to continue gas flow through the compressor, causing gas flow to momentarily stop. As flow stops, the inlet pressure falls and the outlet pressure may become greater than the inlet pressure, which causes a flow reversal within the compressor (i.e., gas flow is momentarily from the outlet to the inlet). The flow reversal is maintained until an adequate pressure head develops at the turbine inlet to overcome the surge condition. If compressor operation continues near the surge point, the surge condition will repeat, causing repetitive flow reversals, until the process conditions change. The flow reversals associated with compressor surge create compressor thrust reversals that can cause unstable axial and radial vibration that can damage the compressor and create high levels of noise.

To avoid compressor surge from occurring and damaging the compressor, antisurge systems are built around the compressor. It is commonly known that antisurge systems require high capacity antisurge valves (i.e., large flow and high pressure valves). For example, antisurge valves may have 22 inch ports and operate at a 550 psi pressure differential. One of ordinary skill in the art can appreciate that these flow conditions create high mass flow rates that can produce very turbulent flow and create unacceptable levels of aerodynamic noise. To prevent unwanted noise and damaging vibration, antisurge valves also rely upon noise attenuating fluid pressure reduction devices.

Current fluid pressure reductions devices, such as the Whisperflo® trim, available from Fisher Controls International LLC of St. Louis, Mo., use multi-stage fluid pressure reduction designs formed from a stack of annular plates that define the multiple restrictive passageways between a hollow center and an outer perimeter. In such a device, the fluid moves through a series of passageways that create changes in radial and axial flow through a series of contraction-expansion fluid structures that substantially reduces fluid pressure by mixing the fluid flows and separating the fluid into numerous, distinct high velocity jets at the outlet of the device. These conventional devices are known by those of ordinary skill in the art to work best in applications with low to mid pressure-drop ratios; not in very high pressure-drop ratio applications.

High pressure-drop ratio applications may be identified as applications where the ratio of the pressure drop across the fluid pressure reduction device with respect to the inlet pressure exceeds a specified ratio, such as 0.93. Similarly, other applications are defined as high pressure-drop ratio applications when, relative to process conditions, the inlet-to-outlet area ratios of the fluid pressure reduction device facilitate sonic flow (i.e., fluid velocities greater than or equal to the speed of sound) at the final or outlet stage of the device. It is generally understood that sonic flow for compressible fluids in fluid pressure reduction devices means "choked flow". One skilled in the art can appreciate that at choked flow, there is a discontinuity between upstream and downstream flow conditions. That is, with respect to the pressure reduction device and its internal fluid structures, the mass flow rate is exclusively proportional to the upstream pressure. It is typically these flow conditions (i.e., maximum mass flow) that produce sonic fluid velocities. When the fluid velocities approach the speed of sound, shock cells form within the fluid that contribute to unacceptably high levels of noise. In high pressure-drop ratio applications, conventional fluid pressure reduction devices quickly experience choked flow and are not acceptable in such applications where noise level and vibration are a concern.

To solve such a problem, conventional fluid pressure reduction devices typically reduce unacceptable noise levels induced in high pressure-drop ratio applications by placing a supplemental baffle around the fluid pressure reduction device to provide sufficient flow area at the periphery of the device to create a small, controlled pressure drop at the outlet stage. The controlled pressure drop induces a back pressure at the outlet stage to restrict outlet fluid velocities to subsonic flow. Unfortunately, large baffle areas are required for very high pressure-drop ratio applications and these types of baffle/attenuator devices cannot be easily placed in valve bodies for valve trim. This approach also significantly increases the manufacturing cost of large diffusers. Additionally, typical multi-stage fluid pressure reduction devices generally do not have enough physical structure within the housing to withstand the very high pressure drops and have been known to physically separate while under load, causing catastrophic damage to the valve body or the piping/duct system around the diffuser.

Other conventional approaches to improve traditional fluid pressure reduction performance in high pressure-drop ratio applications include decreasing inlet-to-outlet area ratios within the device, such as reducing the number of inlets available within the device. Unfortunately this technique reduces overall fluid capacity of a system or valve. To maintain a given fluid capacity for a device with such a decreased inlet-to-outlet area ratio, the overall stack height of the fluid pressure reduction device must increase. This technique is not viable in valve trim or diffusers as increases in stack height may make the structure too large to fit within valve bodies or duct work and may be too costly to manufacture. Accordingly, it is desirable to create an improved fluid pressure reduction device for high pressure-drop ratio applications that may be suitable for diffusers and/or valve trim.

SUMMARY OF THE INVENTION

In an example fluid pressure reduction device, the device comprises two or more stackable annular plates, each plate having a hollow center and a perimeter aligned along a longitudinal axis when the annular plates are stacked one on top of the other. Each plate has at least one inlet flow sector having an inlet flow stage for defining a first inlet area and a first outlet area, and at least one outlet flow sector having an outlet flow stage defining a second inlet area and a second outlet area, wherein the ratio of the second inlet area to the second outlet area is predetermined to define a backpressure at the outlet flow stage to provide a subsonic fluid flow at the perimeter. The fluid pressure reduction device may provide two stages of subsonic fluid flow to substantially reduce any associated aerodynamic noise.

In another example fluid pressure reduction device, a plurality of stacked annular plates, each plate having a hollow center and a perimeter aligned along a longitudinal axis when the annular plates are stacked on top of one another. Each plate further comprises an inlet flow sector and an outlet flow sector. The inlet flow sector has an inlet flow stage comprising a fluid inlet slot partially extending from the hollow center towards the perimeter and a first plenum being radially adjacent to the fluid inlet slot and partially extending from the perimeter towards the hollow center. The outlet flow sector has an outlet flow stage comprising a fluid outlet slot partially extending from the perimeter towards the hollow center and a second plenum being radially adjacent to the fluid outlet slot and partially extending from the hollow center towards the perimeter.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, in which:

DETAILED DESCRIPTION

Figure 1:
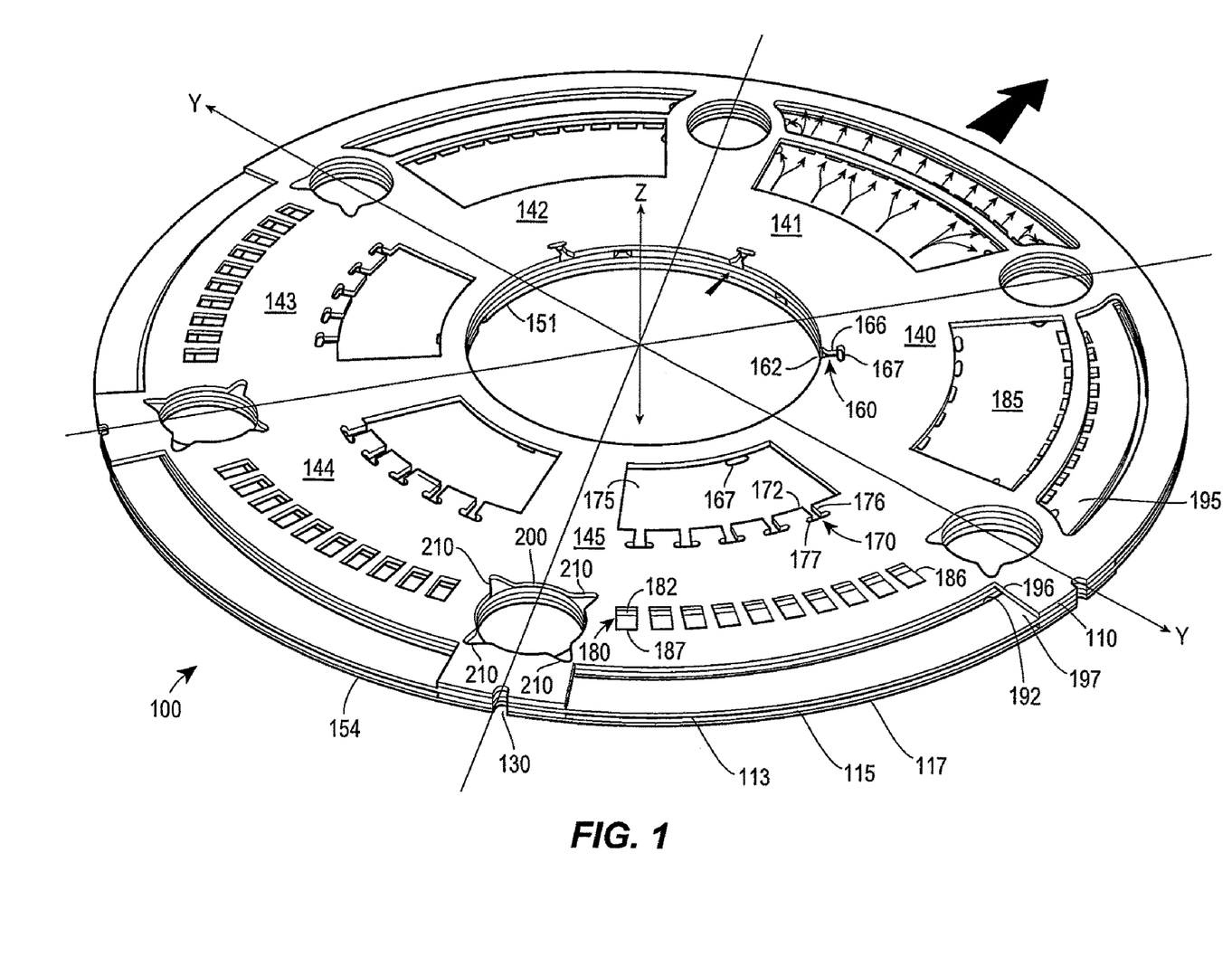
FIG. 1 is a perspective view of a stacked plate assembly of a diffuser in accordance with an example fluid pressure reduction device.
Figure 2:
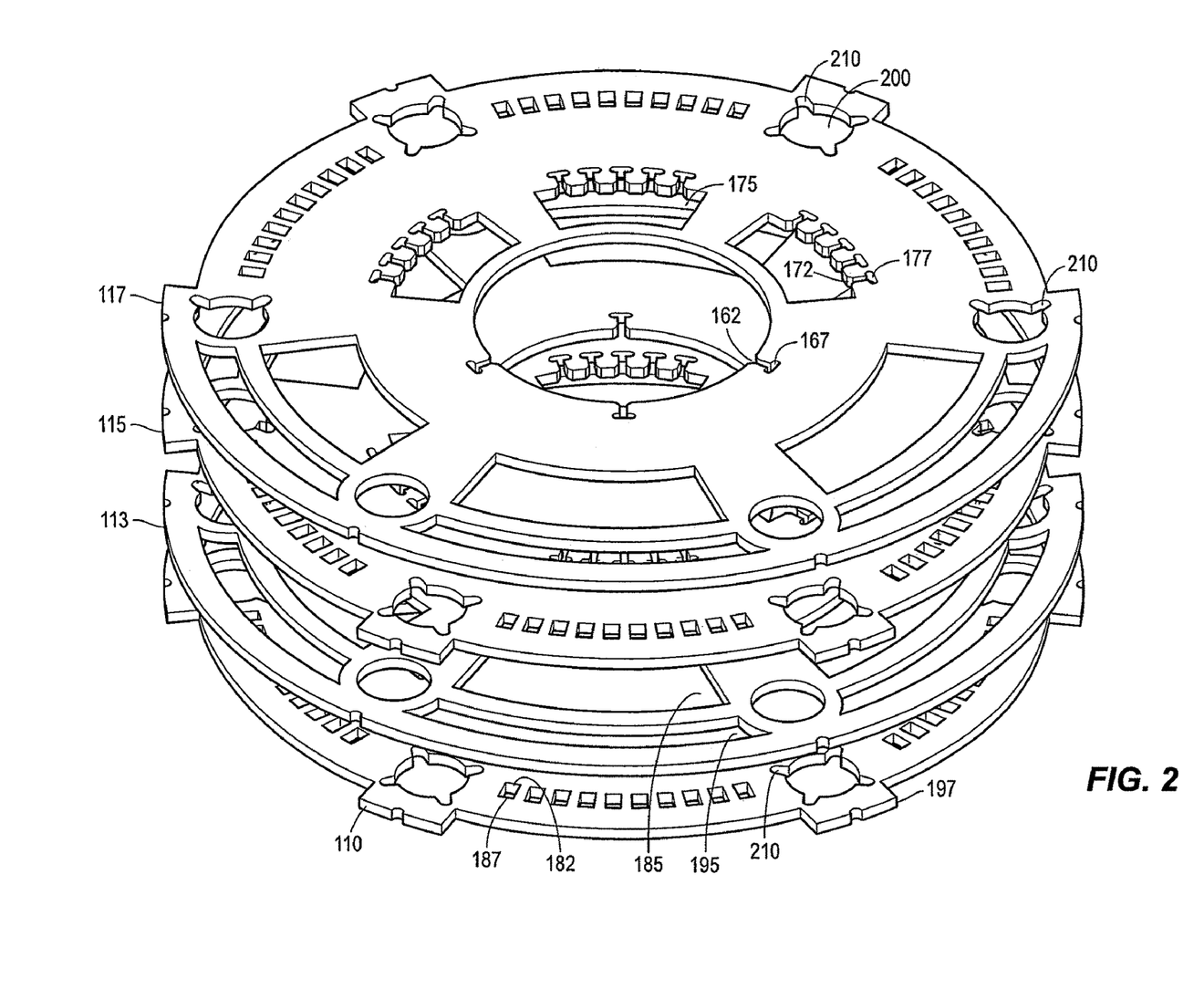
FIG. 2 is an expanded perspective view of the example diffuser of FIG. 1.

An example fluid pressure reduction device for a diffuser is shown in FIGS. 1 and 2. The example fluid pressure reduction device or diffuser uses a stack of annular plates to provide multiple pressure reduction flow paths between inlets and the outlets of the device. The stacked plate assembly may be characterized as follows: 1) the stacked plate assembly has multiple pressure reduction flow paths having inlets at a hollow center and outlets at an outer perimeter radially aligned in individual flow sectors; 2) the pressure reduction flow paths are generally radial and are defined by more than at least two pressure reduction stages coupled in series with each pressure reduction stage being coupled to at least one subsequent pressure reduction stage in an adjacent annular plate; and 3) each stage includes one or more apertures where the inner or first and second stage apertures have well-rounded or well-tapered inlet and an abrupt discharge and the outer stage or third or fourth stages have restrictions that provide a predetermined back pressure to control the fluid velocities at the exterior of the device to maintain subsonic flow.

In a first example embodiment, the perspective views of FIGS. 1 and 2 illustrate a diffuser 100 for use in a turbine bypass application or any similar application where a large volume of gas is discharged or dumped in a manner that produces very high pressure-drop ratios. It should be understood that although the example diffuser 100 is described using four annular plates 110, 113, 115 and 117, the diffuser too may be comprised of any number of annular plates including variations in stacked height and plate diameter, as required by a specific application, without departing from the spirit and scope of the example fluid pressure reduction device. The flow characteristics of the example diffuser 100 can be best understood when the diffuser is divided into six, substantially similar flow sectors 140, 141, 142, 143, 144 and 145. Each flow sector 140, 141, 142, 143, 144 and 145 contains passageways that connect a series of inlets 162 at a hollow center 151 to an outlet 197 at an outer perimeter 154 of the diffuser 100. More specifically, each flow sector 140, 141, 142, 143, 144 and 145 comprises at least three flow stages, and preferably four flow stages, that provide the pressure reduction across the diffuser 100, as described below. The pressure reducing flow stages 160, 170, 180 and 190 may be formed across at least a pair of the annular plates 110 and 113, and preferably may be formed across three adjacent plates 110, 113 and 115, to provide radial, lateral and axial flow within a flow sector of the diffuser too (as shown with flow arrows in FIG. 1 and described below).

Referring to FIGS. 1 and 2, a first pressure reduction stage 160, formed across a first fluid restriction within each flow sector 140, 141, 142, 143, 144 and 145 by a narrow inlet 162 connecting to a relatively broader outlet 167 by a first intermediate passageway 166. A second pressure reduction stage 170 is formed across a multiple second fluid restrictions within each flow sector 140, 141, 142, 143, 144 and 145 provided by narrow inlets 172 connecting to relatively broad outlets 177 by a series of respective second intermediate passageways 176.

Similarly, a third pressure reduction stage 180 is formed across multiple third fluid restrictions provided through inlets 182 connecting to outlets 187 by a third series of intermediate passageways 186 and a fourth pressure reduction stage 190 is formed across a fluid restriction provided through an inlet 192 connecting to an outlet 197 by an intermediate passageway 196. One skilled in the art can appreciate that the first, second and third stages 160, 170 and 180 include passageways that lead into the apertures of subsequent stages and each pressure reduction stage is radially aligned along the associated sector within the individual plates. Within the example diffuser 100, a pattern of the four pressure reduction stages 160, 170, 180 and 190 is repeated around the circumference of the diffuser 100 through each sector 140, 141, 142, 143, 144 and 145 to form a total of six flow sectors with four pressure reduction stages each. It should be appreciated that variations in the total number of flow stages and flow sectors may be contemplated without departing from the spirit and scope of the present fluid pressure reduction device.

To achieve the staged fluid control and desired pressure reduction within the diffuser 100, the fluid flow passageway progresses from the hollow center 151 to the outer perimeter 154 of stacked plate assembly with a preferred plate rotational offsets as shown. That is, it should be understood that at least two substantially identical annular plates 110 and 113 in a preferred rotation are required to provide the pressure reduction flow path in the example pressure reduction device 100. To assist in proper rotational alignment, the annular plates are provided with registration notches 130 at the outer perimeter 154 to align the passageways. The desired orientation throughout the entire stack occurs when each plate in the stack is preferably positioned relative to adjacent plates as shown in FIG. 1. One skilled in the art can appreciate the preferred orientation may be achieved by rotating each plate 180 degrees about the longitudinal or z axis and/or "flipped" or rotated about the y axis. With the preferred rotational orientations of each plate within the stack, the desired fluid pressure reduction and suppression of aerodynamic noise may be achieved. Additionally, these notches may aid in fabrication of the example pressure reduction device 100. For example a "handing weld" may be placed within the notches to secure the plates together, prior to assembly.

In operation as fluid flow is initiated in the example diffuser 100, fluid initially enters the inlets 162 on a first plate 113 at the hollow center and flows through the first stage 160. At the first pressure reduction stage 160, fluid flows from the inlet 162 through an intermediate passageway 166 to the first stage outlet 167 in the first plate 113. The first stage outlet 167 is aligned with a first plenum 175 in at least one adjacent plate 110, and preferably a second adjacent plate 115, so that fluid flow exiting the first stage 160 enters at least the first plenum 175 preceding the second stage 170. One of ordinary skill in the art can appreciate the relatively narrow first stage inlet 162 on the first plate 113 increases the velocity of the fluid as it enters the restriction, due to relatively constant mass flow. As the fluid exits the first stage outlet 167 a subsequent expansion of the fluid in the first plenum 175 creates a corresponding pressure drop.

As the fluid flows from the first plenum 175, it enters the relatively narrow second stage inlets 172 on the adjacent second plate 110. As previously described, the restrictive inlets accelerate the fluid into the broad second stage outlets 177 inducing a second pressure drop. The fluid from the second stage 170 is collected within an associated second plenum 185 wherein the fluid is mixed from multiple second stage outlets 177 in radial, lateral and axial directions (i.e., fluid is mixed from adjacent upper and lower plate plenum areas). The fluid pressure source at the inlet continues to drive the fluid from the second stage outlets 177 to the second stage plenum 185 and into the third stage inlets 182 on the first plate 110. As shown in FIG. 1, the third stage outlets 187 align with the fourth stage inlet 192 on the second plate 113 to direct the fluid to the broad fourth stage outlet 197 at the outer perimeter 154 of the stack to create the desire diffuser pressure reduction. It should be appreciated that the geometry of the first and second pressure reduction stages 160 and 170 has common features, which may provide substantial reductions in fluid pressure prior to the final or outer stages. That is, the first and second pressure reduction stages include an aperture that discharges into a plenum. The aperture is characterized by the well-rounded inlet in order to achieve minimum fluid contraction (i.e., high flow capacity) followed by an abrupt discharge at the outlet to achieve rapid fluid expansion (i.e. a large pressure drop). In the example diffuser 100, these nozzle-type apertures create a relatively large pressure drop in a small radial distance. The example diffuser advantageously uses these fluid structures to create a substantial pressure drop within the first two stages 160 and 170 to limit the pressure drop required within the outer stages to reduce the overall turbulence and noise in the device.

Preferably, the first two stages 160 and 170 of the example diffuser too may create sonic flow, or even supersonic flow, in realizing the relatively large pressure drop. These flow conditions may also create substantial noise, but one of ordinary skill in the art can appreciate that noise generated within the inner stages 160 and 170 is not efficiently coupled outside the diffuser 100, and therefore, the noise generated by sonic or supersonic flow within these stages does not appreciably affect the noise level of the device. Alternatively, the pressure drop, and therefore the fluid velocity at the outer stages of the device, has a substantial effect on the overall noise level. To address this issue, the third and fourth stages 180 and 190, provide a relatively smaller pressure drop with generally rectangular shaped apertures to substantially improve the attenuation of the aerodynamic noise through of the third and fourth stage. That is, the lack of a relatively narrow restrictive portion (e.g., the contraction-expansion geometry of the first and second stage) substantially reduces the overall pressure drop within the outer stage 180 and 190 while allowing improved control of the inlet-to-outlet are ratios, as described in detail below.

It should further be appreciated that in the example diffuser 100 fluid flow may not be specifically isolated between two plates. For example, referring to FIG. 2, flow into a second stage may flow into adjacent plates above and below the plates to provide an axial fluid path with the device. The flow path may progress through at least two successive plates in the stacked plate assembly and includes radial, lateral and axial flow components, with a general direction that may be considered "diverging radial" flow with respect to a cross-section of the stacked plate assembly. FIG. 1 further illustrates the combining of adjacent fluid flow within a pressure reduction flow path (shown by flow arrows in flow sector 141) through at least two plate section of stacked plate assembly. The fluid flow in the example diffuser 100 includes a radial and lateral flow components from hollow center through first stage in the first plate, an axial flow component from the first plate to the second plate, a radial and lateral flow component through second stage in a second plate, an axial flow component from the second plate to the first plate, a radial and lateral flow component through third stage in the first plate, an axial flow component from the first plate to the second plate, and a substantially radial flow component through fourth stage in the second plate to outer perimeter.

It should also be appreciated that in order to maintain the mass flow through the diffuser, as the velocities decrease through the respective pressure reduction stages, the aperture areas (i.e., the inlet-to-outlet ratios) of each stage must increase. To ensure ample flow capacity, the example diffuser 100 flow sectors 140, 141, 142, 143, 144 and 145 have the first stage formed with one aperture connected to a respective first plenum passageway; the second stage includes five apertures connected to a single large second plenum passageway; the third stage includes ten apertures connected to a single third plenum passageway; and the fourth stage includes one relatively wide aperture connected to the outer perimeter of stacked plate assembly. Thus, the number of apertures increases as the flow progresses through the pressure reduction flow path until the final stages. It should be appreciated that the number and size of the apertures in the various flow stage may be specific to a given application or design choice. Additionally, in the example diffuser the third and fourth stage 180 and 190 are preferably rectangular in shape to provide an inlet-to-outlet area ratio to substantially eliminate acceleration of the fluid to sonic velocities as previously described for the first and second stages 160 and 170 while promoting substantial mass flow through the example diffuser 100. The rectangular shape of the third stage within the flow sectors advantageously permits a maximum number of parallel flow paths to maximize fluid flow while providing separation of the fluid jets at the outlets 187 to minimize jet interactions at the fourth stage inlets 197.

It is generally understood that conventional multi-stage fluid pressure reduction devices often utilize multiple outlets in the final stage of the fluid pressure reduction device which may not be acceptable in high pressure-drop ratio applications. That is, numerous small geometry outlets tend to promote jet separation, which is known to reduce noise due to jet interaction, but unfortunately this configuration also promotes relatively large increases in fluid velocity, which tend to substantially increase noise related to fluid velocity if sonic fluid velocities develop. In the example diffuser 100, the large rectangular shape of the fourth stage does not create sonic velocities. In fact based upon its large cross-sectional area, the low restriction outlet of the example diffuser 100 cannot accelerate the exiting fluid, relative to the prior stage. However it does provide a predetermined inlet-to-outlet area ratio in the final stage to promote subsonic flow. As described in greater detail below, the inlet-to-outlet area ratios in the third and fourth stages have been predetermined to provide a specific back pressure (i.e. a controlled pressure drop across the stage) to maintain subsonic flow at the outlet in very high pressure-drop ratio applications.

In addition to controlling the outer stage pressure drop, the example diffuser 100 advantageously provides noise reduction by substantially eliminating any columnar flow interaction that may results within the plate stack (i.e. uncontrolled axial flow thin the fluid pressure reduction device). As illustrated in FIG. 1, the orientation of the plates, as described above, positions the inlets 162 in the first stage in a staggered or asymmetric arrangement. The asymmetric placement of the inlets 162 of the first stage 160 may provide a maximum number of inlets from the hollow center while preventing axial alignment of such inlets. One of ordinary skill in the ar may appreciate that the asymmetric placement creates a diagonal placement of the first stage inlets that substantially eliminates the formation of columnar axial flows within the stack of plates, which may reduce the formation of unacceptable noise levels. The example diffuser 100 also eliminates known problems of conventional diffusers mounting arrangements that may be adversely effected by thermal gradients.

As shown in FIG. 1, the annular plates of the present example pressure reduction device include internal fastener apertures 200 aligned along an axial direction when the annular plates are stacked. As previously described, diffusers typically release high pressure, high temperature gas into a low pressure, low temperature atmosphere. Conventional stacked plate diffusers often require superior structural integrity and mounting arrangements to withstand such conditions. As such, typical diffusers are generally assembled and secured to a piping or duct system with clamping bolts located about the exterior surface of the diffuser in a circle outside the plate stack. This type of arrangement utilizes commonly known raised-face flanges that require additional diametric clearance due to the large bolts required to achieve the appropriate total bolt load and retention of the plates in operation.

This typical mounting arrangement is disadvantageous because the large bolts become flow restrictions limiting flow at the outlet of the diffuser plates, where capacity is most needed due to expansion of the gases at reduced pressure. Additionally, during venting, the possibility of thermal gradients between the bolting and plate stack can cause differential thermal expansion that creates an overloading/unloading of the retaining bolts that can lead to catastrophic failure of the diffuser. An alternative to locating the bolting outside the plate stack is locating them internal to the annulus of the plates. Conventional integrated bolting has placed isolated apertures with the stack to reduce the outlet restrictions presented by the bolts. Unfortunately, this technique does not adequately address the rapid thermal changes (i.e., large thermal gradients) that may result from high pressure, high temperature fluid dumps or discharges, such as the types that occurs in turbine bypass applications. The example diffuser of FIGS. 1 and 2 solves both the thermal gradient problem and the flow restriction problem.

The annular plates of the stacked plate assembly 100 includes apertures 200 placed about the outer perimeter 14, preferably symmetrically located between the flow sectors 140, 141, 142, 143, 144 and 145. The apertures 200 provide multiple fluid passageways 210 about the bolt apertures 200 to circulate the fluid flowing through the diffuser around the fasteners or bolts (not shown). This arrangement produces at least three advantages: 1) the bolting can be located adjacent to higher pressure chambers where flow restriction is desirable and therefore does not limit total capacity; 2) the plate stack diameter includes the bolt circle and therefore the fluid pressure reduction device can be larger in diameter than conventional diffuser and has more outlet area to allow flow of the expanding gas therefore providing greater capacity; and 3) the process fluid has more interaction and dwell time with the bolting to better accommodate large thermal gradients.

Figure 3:
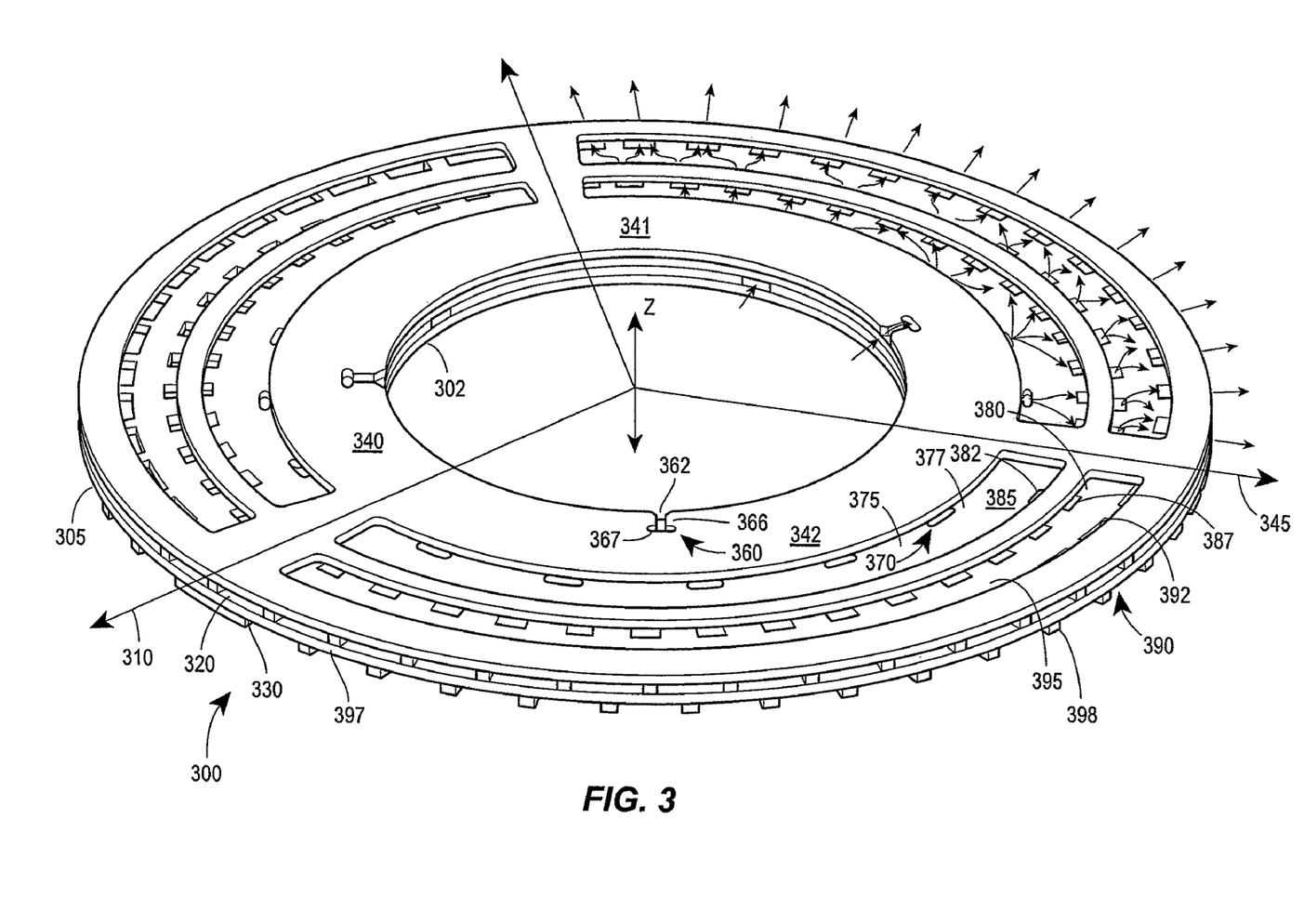
FIG. 3 is a perspective view of a stacked plate assembly of a valve trim in accordance with an example fluid pressure reduction device.
Figure 4:
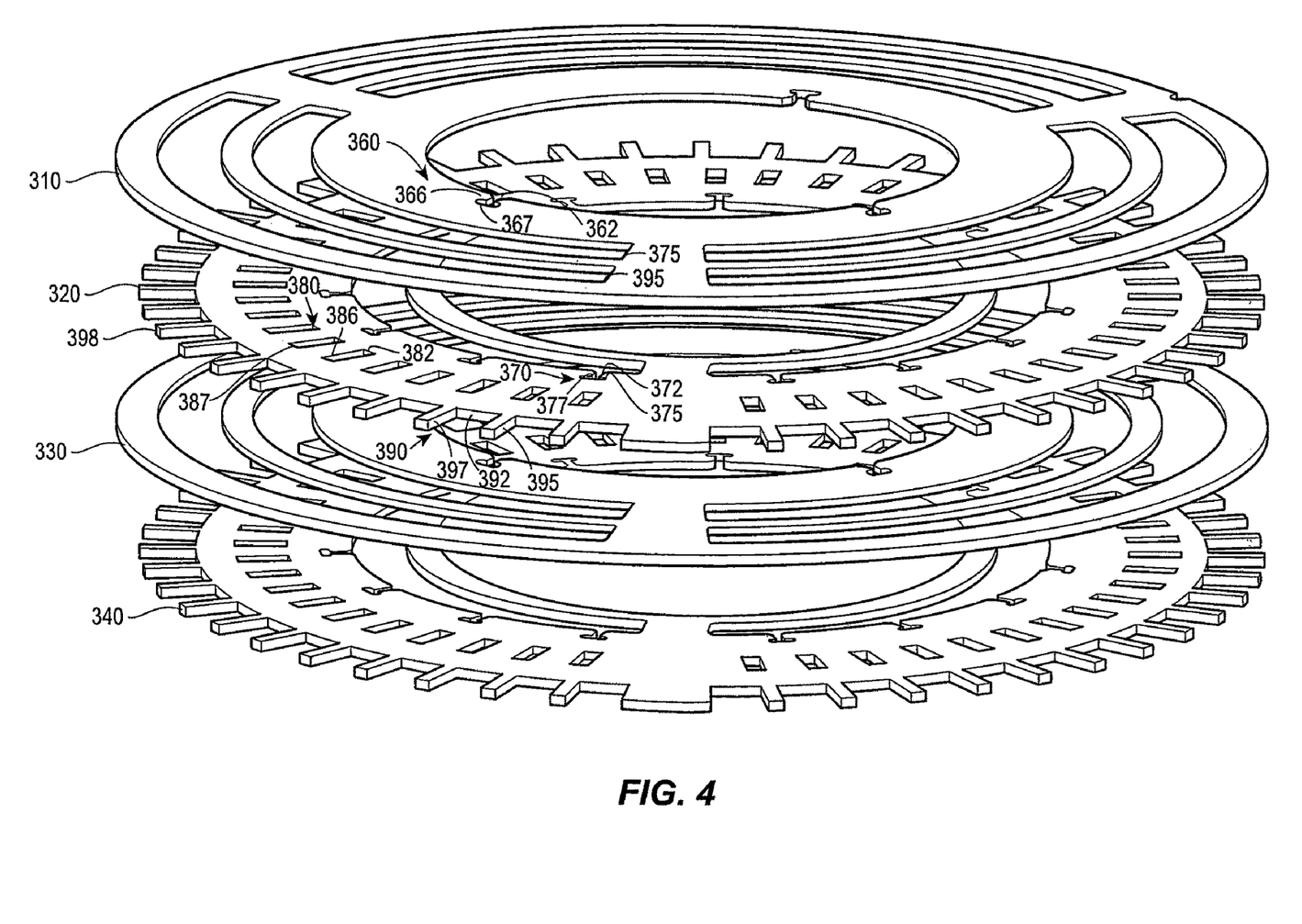
FIG. 4 is an expanded perspective view of the example valve trim of FIG. 3.

A second example fluid pressure reduction device, configured as valve trim, is shown in FIGS. 3 and 4. Similar to the example diffuser previously described, the example valve trim 300 comprises a stacked plate assembly including a stack of annular plates assembled about a longitudinal axis z and aligned along a registration notch 345. The valve trim 300 is formed about a hollow center 306 that provides fluid entry through a series of inlets 362 formed within substantially similar flow sectors 340, 341 and 342 that includes passageways to an outer perimeter 305 that serves as an outlet of the device. In the valve trim 300, the hollow center 306 also forms a journal in which a valve plug (not shown) may move through the plane of each plate exposing individual inlets 362 relative to the valve plug position in order to control fluid entry the valve trim 300.

Yet unlike the example diffuser previously described, the present example valve trim 300 is comprised of a number of annular plate pairs, which define the fluid passageways. The plate pairs are comprised of: a plenum plate 310 and a flow plate 320. An exploded perspective view of four annular plates is shown in FIG. 4. Each pair of the annular plates provides a radially aligned first pressure reduction stage, a second pressure reduction stage, a third pressure reduction stage, and a fourth pressure reduction stage. Each pressure reduction stage includes one or more apertures followed by one or more passageways, as described below. Similar to the example diffuser, each stages include passageways that lead into the apertures of their subsequent stages. The pressure reduction stages and the flow paths of the example valve trim are radially aligned in sectors along individual plates with the pattern of the four pressure reduction stages repeated around the circumference of the example valve trim to form a total of three flow sectors with four stages each.

The example valve trim 300 uses a stack of substantially identical annular plate pairs 310 and 320, oriented as described below, to provide multiple pressure reduction flow paths between inlets and the outlets of the device. The perspective views of FIGS. 3 and 4 illustrate the valve trim 300 using two annular plate pairs, but one of ordinary skill in the can appreciate that the any number of pairs annular plates may be of a various stacked height and plate diameter, as required by the application, without departing from the spirit and scope of the example valve trim. Each annular plate pair 310 and 320 may be divided into flow sectors 340, 341 and 342 that connect the flow passageways from the inlets 362 at the hollow center 306 to the outlets 397 at the outer perimeter 305. More specifically, each sector 340, 341 and 342 comprises at least three flow stages, and preferably four stages, that provide the fluid pressure reduction across the device. The flow stages 360, 370, 380 and 390 may be formed across at least a pair of the annular plates 310 and 320, and preferably, may be formed across three adjacent plates 310, 320 and 330 to provide radial, lateral and axial flow within the device, as previously described.

As shown in FIGS. 3 and 4, each pressure reduction stage 360, 370, 380 and 390 includes one or more apertures followed by one or more passageways. A first pressure reduction stage 360 is formed across a first fluid restriction provided by a narrow inlet 362 connecting to a relatively broader outlet 367 by an intermediate passageway 366. A second pressure reduction stage 370 (shown in FIG. 4) is formed across a multiple second fluid restrictions provided by a narrow inlet 372 connecting to a relatively broad outlet 377 by an intermediate passageway 376. A third pressure reduction stage 380 is formed across multiple third fluid restrictions provided through an inlet 382 connecting to an outlet 387 by an intermediate passageway 386, and a fourth pressure reduction stage 390 is formed across a fluid restriction provided through an inlet 392 connecting to an outlet 397 by an intermediate passageway 396.

As illustrated with flow arrows in FIG. 3, the pressure reduction flow paths progress from the hollow center 306 to the outer perimeter 305 of stacked plate assembly with the preferred plate rotational offsets as shown. The annular plates 310 and 320 are provided with a registration notch 345 to align the passageways. Each flow plate 320 in the stack is preferably rotated relative to adjacent plates as shown in FIG. 3. One skilled in the art should appreciate that the preferred orientation may be achieve rotating the adjacent plates by 180 degrees about the longitudinal or z-axis or flipping adjacent plates about the y axis to align the passageways. The plenum plates are substantially identical and may be aligned along the registration notch for proper orientation within the stack. With the illustrated rotational orientations, the first stage outlet 367 is aligned with a first plenum 375 in at least one adjacent plate 320, and preferably a plenum in an adjacent plate 340, so that fluid flow exiting the first stage 360 enters at least the first plenum 375 formed within the adjacent plate 320. As previously explained, the contraction-expansion of the fluid through the nozzle-type restrictions induces the desired pressure drop in the fluid. The relatively lower pressure fluid is collected in the first plenum 375 and transferred under pressure to the outer stages. The flow path may progress through at least two successive plates in the stacked plate assembly and includes radial, lateral and axial flow components, with a general direction that may be considered "diverging radial" flow with respect to a cross-section of the stacked plate assembly.

As fluid flows through the first plenum 375, it enters the relatively narrow second stage inlets 372 on the adjacent second plate 320. The restrictive second stage inlets accelerate the fluid into the broad second stage outlets 377 inducing a second pressure drop. The fluid from the second stage 370 is collected with second plenum 385 formed in at least the first plenum plate 310, and preferably a second plenum plate 330, wherein the fluid is mixed in radial and lateral directions. Fluid continues to flow from the second stage outlets 377 and into the third stage inlets 382 on the adjacent flow plate 320.

The third stage outlets 387 align with the fourth stage inlets 392 on the second plate 320 to direct the fluid through the relatively broad fourth stage outlets 397 at the outer perimeter 305 of the stack. The outlet 397 may be divided into multiple outlets segregated by stiffening elements 398, as shown, without adversely affecting the predetermined back pressure. For example, in any fluid pressure reduction device herein described it may be desirable to include stiffening elements within the outlet area to substantially eliminate vibration-induced resonances at the outlet without substantially reducing the desired outlet flow area. In valve trim applications, the annular plates may be secured together by welds around the periphery of the stacked plate assembly or may be brazed together. As such, the stiffening elements of the flow plate may be bonded to the adjacent plenum plates to reduce the continuous outlet areas exposed to high velocity flows that may induce vibrations and noise in the device.

The pressure reduction flow paths progress from the hollow center 306 to the outer perimeter 305 of stacked plate assembly 300 and are provided by stacking annular plates with rotational offsets as shown. Additionally, one of ordinary skill in the art can also appreciate that similar to the example diffuser, the inlets 362 to the first stage may be asymmetrically placed about the hollow center. It is believed that the asymmetric placement of the inlets 362 of the first stage 360 permits a maximum number of inlets from the hollow center while preventing an axial alignment of such inlets, which may eliminate the formation of columnar axial flows within the stack of plates that may reduce the formation of unacceptable noise levels. It should also be appreciated that the successive flow plate outlets are not aligned along the longitudinal axis. Successive flow plate outlets 397 may be rotated relative to the adjacent plates to ensure adjacent outlets along the longitudinal axis z do not align. Jet interaction at the outlets may promote unacceptable noise levels, thus the non-aligned outlets may substantially reduce the radiated noise from the fluid pressure reduction device. Additionally, the preferred alignment of the outlets 397 minimizes the distances between the stiffening elements 398 to substantially increase the resonant frequency of the outlets to further minimize audile noise.

Lastly, it should be appreciated that, similar to the example diffuser, the third stage restrictions of the example valve trim 300 do not have a converging-diverging (i.e., nozzle-like) geometry such as the first and second stage restrictions. As previously explained, the third stage and fourth stage function to provide a predetermined back pressure to the previous stages while providing a relatively smaller pressure drop that substantially improves the attenuation of the aerodynamic noise in a high pressure-drop ratio application by substantially eliminating sonic flow at the outlets. Thus, in either example fluid pressure reduction device, the overall device noise may be substantially reduced by creating a specific pressure drop at the outlet stages defined by the inlet-to-outlet areas ratios of a given stage.

One skilled in the art can appreciate that there exists numerous methods to predetermine or select the pressure-drop ratios and passageway geometries as previously described that provide subsonic flow at the outlet stage of the example fluid pressure reduction devices without departing from the spirit and scope of the example fluid pressure reduction devices. One such method is described in detailed below. For example, recognizing that for compressible fluids, such as steam, a pressure-drop ratio in excess of 0.5 may promote sonic flow, a four-stage device, such as the example diffuser 100 or the valve trim 300, may be designed to substantially reduce radiated noise in a high pressure-drop ratio application. More specifically, a four-stage fluid pressure reduction device may have subsonic flow at the outlets by selecting the third and fourth stage pressure-drop ratios to be approximately 0.4

It is generally understood that the pressure-drop ratio is useful for predicting the fluid velocities through flow components (e.g., a fluid pressure reduction device or a fluid passageway within the fluid pressure reduction device) and may be determined using Equation 1, below.

$$i. \quad x = \frac{P_{inlet} - P_{outlet}}{P_{inlet}} \quad \text{Equation 1}$$

As shown above in Equation 1, the pressure-drop ratio (x) is equal to the ratio of the pressure differential ($P_{inlet} - P_{outlet}$) across the fluid component and the inlet pressure ($P_{inlet}$). For example, with an inlet pressure ($P_{inlet}$) of 400 psia with an outlet pressure ($P_{outlet}$) of 14.7 psia, the pressure-drop ratio (x) is approximately 0.963. As previously described, an application with these inlet/outlet parameters would be classified as a high pressure-drop ratio application and would require performance beyond conventional fluid pressure reduction devices to attain acceptable noise levels. To solve for the sequential pressure drop relationships for a multistage device, such as the present example fluid pressure reduction device, one can appreciate that in the intermediate stages, the outlet pressure from a preceding stage within a flow sector is substantially equal to the inlet pressure of a following stage. This relationship can be exploited when calculating the individual stage pressure-drop ratios that will lead to the geometry considerations (i.e. inlet-to-outlet area ratios) when deriving the device parameters.

One skilled in the art can appreciate that determining the inlet and outlet pressures for a given stage will provide the basis determining the geometry of the stage to achieve the desired pressure reduction, and therefore the desired pressure-drop ratio. For example, by selecting the flow through all of the stages to be constant (i.e. substantially equal), known sizing equations for compressible fluids from the American National Standards Institute/Instrument Society of America ANSI/ISA-75.01.01-2002 publication may be used to derive the area ratios for each of the stages for both non-choked flow and choked flow conditions. By solving the equation for mass flow rate and selecting the flow through each stage to be substantially the same (i.e., constant flow through each stage of the device), the area ratios for the inlet areas and outlet areas for each stage may be determined.

Thus, knowing the inlet pressure ($P_{inlet}$), the outlet pressure ($P_{outlet}$) of the overall device and the desired final stage pressure-drop ratios for the third and fourth stage, ($x_3$=0.4 and $x_4$=0.4) for a given application, one of ordinary skill in the art may calculate the remaining fluid relationships (i.e., stage pressures drop and stage area ratios).

As shown in Equation 2 below, the fourth stage inlet pressure ($P_{4inlet}$) can be determined from the known fourth stage outlet pressure (e.g. $P_{4outlet}$=14.7 psia) and the predetermined fourth stage pressure-drop ratio (e.g., $x_4$=0.4). For example with the given conditions of the present example, the fourth stage inlet pressure may be approximately 14.7 psia divided by 0.6 or 24.5 psia. As previously described, for the intermediate stages, the outlet pressure of a preceding stage is substantially equal to the inlet pressure of a subsequent stage, as shown in Equation 3.

$$ii. \quad P_{4inlet} = \frac{P_{4outlet}}{1 - x_4} \quad \text{Equation 2}$$

$$iii. \quad P_{3outlet} = P_{4inlet} \quad \text{Equation 3}$$

$$iv. \quad P_{3inlet} = \frac{P_{3outlet}}{1 - x_3} \quad \text{Equation 4}$$

When solving for the third stage inlet pressure ($P_{3inlet}$), the fourth stage inlet pressure ($P_{4inlet}$) calculated in Equation 2 may be substituted in Equation 4 for the third stage outlet pressure ($P_{3outlet}$). Therefore, when the example third stage pressure-drop ratio, $x_3$, is desired to be 0.4, the inlet pressure to third stage ($P_{3inlet}$) may be approximately 24.5 psia divided by 0.6 or 40.8 psia. Once the pressure conditions for the fourth stage and the third stage have been determined, the remaining parameters for the second and first stage can be determined. Equations 5 and 6 shown below define the pressure-drop ratios for the second and first stages, respectively.

$$v. \quad x_2 = \frac{P_{2inlet} - P_{2outlet}}{P_{2inlet}} \quad \text{Equation 5}$$

$$vi. \quad x_1 = \frac{P_{1inlet} - P_{1outlet}}{P_{1inlet}} \quad \text{Equation 6}$$

One skilled in the art may further appreciate that it may be preferable to take a substantial pressure drop within the inner stages of the fluid pressure reduction device to provide substantial reductions fluid energy to reduced the noise radiated at the outer stages of the device. Specifically, the inner stages may have pressure-drop ratios in one or both stages that produce sonic fluid velocities, but as previously explained, due to poor acoustic coupling from the internal stages to the outlet perimeter, the noise generated by these inner stages does not adversely affect the overall noise attenuation characteristics of the device.

One skilled in the art may also appreciate that the pressure-drop ratios of first and second stages may be, but not necessarily, substantially equal, as shown in Equation 7.

$$vii. \quad \frac{P_{1inlet} - P_{1outlet}}{P_{1inlet}} = \frac{P_{2inlet} - P_{2oulet}}{P_{2inlet}} \quad \text{Equation 7}$$

$$viii. \quad P_{1outlet} = P_{2inlet} \quad \text{Equation 8}$$

In the present example, the second stage and first stage pressure-drop ratios, $x_2$ and $x_1$, are selected to be substantially equal only to simplify the determination of the inlet and outlet pressures for those stages. As previously described, and as shown in Equation 8, the second stage inlet pressure ($P_{2inlet}$) is substantially equal to the first stage outlet pressure ($P_{1inlet}$).

$$P_{1outlet} = \sqrt{P_{1inlet} \times P_{2outlet}} \quad \text{ix. Equation 9}$$

Therefore, as shown in Equation 9, the first stage outlet pressure ($P_{1outlet}$) can be determined by substituting Equation 8 into Equation 7 and solving for the first stage outlet pressure ($P_{1outlet}$). Thus, in the present example, the first stage inlet pressure ($P_{1inlet}$) was given to be 400 psia and the second stage outlet pressure ($P_{2outlet}$) was derived from Equation 3 (i.e., $P_{2outlet}=P_{3inlet}$). Therefore, after making the substitution, the example first stage outlet pressure ($P_{1outlet}$) may be approximately 127.8 psia and from Equation 5 and 6, the second stage and first stage pressure-drop ratios may be approximately 0.681. Thus, one of ordinary skill in the art can appreciate that for compressible fluids, the second stage and first stage pressure-drop ratios may produce sonic flow within these stages.

Therefore, once inlet and outlet pressures for each stage are determined, standard flow equations found in ANSI/ISA-75.01.01-2002, *Flow Equations for Sizing Control Valves*, Third Printing Mar. 2, 2004, such as Equation 10 and Equation 11, can be used to determine the inlet-to-outlet areas ratios to configure the example four stage device for subsonic flow at the outlet stage.

$$x. \quad w = C_v A N F_p Y \sqrt{x_i \times P_{ioutlet} \times \rho \frac{P_{ioutlet}}{P_{atomsphere}}} \quad \text{Equation 10}$$

$$xi. \quad w = C_v A N Y \sqrt{x_{T_i} \times P_{ioutlet} \times \rho \frac{P_{ioutlet}}{P_{atomsphere}}} \quad \text{Equation 11}$$

That is, by solving the sizing equation for flow (w), and selecting the mass flow of each stage to be substantially equal, one of ordinary skill in the art may calculate the Area (A) of the inlets and outlets to produce the desired mass flow. Thus, by maintaining the Area Ratios for the inlets and outlet for each stage in the geometries of the passageways, the flow through each stage with respect to the pre-determined pressure-drop ratios can be controlled to promote subsonic flow at the outlet stage when the inlet conditions and the outlet conditions are known.

As an example, when the pressure-drop ratios may be approximately 0.4 for the fourth stage and third stage and approximately 0.68 for the second stage and first stage, the inlet-to-outlet area ratios may be about 15.89, 9.52 and 3.13 for fourth-to-third stage, third-to-second stage, and second-to-first stage, respectively. By maintaining these area ratios in the example fluid pressure reduction device, a predetermined back pressure is developed in stages 4 and 3 to promote subsonic flow at final outlet stage. Thus, in general, for applications where the device pressure-drop ratio creates sonic velocities in the outlets, the predetermined inlet-to-outlet area ratios of the example diffuser and valve trim decreases the pressure in a controlled manner to substantially reduce the aerodynamic noise normally associated with such applications.

In summary, the stacked plate assembly may be characterized as follows:

1. the stacked plate assembly has multiple pressure reduction flow paths having inlets at hollow center and outlets at outer perimeter radially aligned in individual flow sectors.

2. The pressure reduction flow paths are defined by more than two pressure reduction stages coupled in series. Each pressure reduction stage is coupled to another pressure reduction stage in at least one adjacent annular plate. The pressure reduction stages may alternate between two plates or may progress through successive plates. Each stage except the last involves radial flow through apertures into a plenums followed by axial flow into the next stage in an adjacent plate (the last stage involves only radial flow through an aperture to the outer perimeter of the stacked plate assembly).

3. Each stage includes one or more apertures. Each aperture of the inner or first and second stage has a well-rounded or well-tapered inlet and an abrupt discharge. Each of these stages discharge into a plenum that is relatively wide in the circumferential direction and is relatively narrow in the radial direction. In outer stages, the restrictions are generally rectangular in shaped and the dimensions are selected to exert a back pressure to control the fluid velocities and maintain subsonic flow.

While there have been shown and described what are at present considered the preferred embodiments of the present invention, it will be obvious to those skilled in the art that various changes and modifications may be made therein without departing from the scope of the invention as defined by the appended claims. For example, the fourth stage of the valve trim may be removed for relatively small control valves or similarly, for relatively large diffusers, an additional flow stage may be used in either an inner stage or an outer stage without departing from the spirit and scope of the present invention.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fluid pressure reduction device comprising:
    two or more stackable annular plates, each plate having a perimeter and a hollow center aligned along a longitudinal axis when the annular plates are stacked one on top of the other, wherein each plate further comprises:
    at least one inlet flow sector having an inlet flow stage for defining a first inlet area and a first outlet area, and
    at least one outlet flow sector having an outlet flow stage defining a second inlet area and a second outlet area, wherein the ratio of the second inlet area to the second outlet area is predetermined to define a backpressure at the outlet flow stage to provide a sub-sonic fluid flow at the perimeter.

2. The fluid pressure reduction device of claim 1, wherein: the at least one inlet flow stage further comprises:

at least one a fluid inlet slot partially extending from the hollow center towards the perimeter, and a first plenum being radially aligned and adjacent to the fluid inlet slot; and partially extending from the perimeter towards the hollow center, and the at least one outlet flow stage further comprises:

at least one fluid outlet slot partially extending from the perimeter towards the hollow center, and a second plenum being radially adjacent to the fluid outlet slot and partially extending from the hollow center towards the perimeter.

3. The fluid pressure reduction device of claim 2, wherein a first plate is selectively positioned to be stacked on top of a second plate to enable fluid flow from the fluid inlet slot of the inlet flow stage of the first plate to the second plenum of the outlet flow stage of the second plate such that a fluid flow is split into an upper and a lower axial direction to flow into adjacent plenum slots with multiple radial flow directions, and then distributed through the at least one outlet stage slot in at least one plate.

4. The fluid pressure reduction device of claim 1, wherein each plate comprises a plurality of flow stages wherein a first flow stage and a second flow stage substantially reduce the fluid pressure therein.

5. The fluid pressure reduction device of claim 4, wherein a third flow stage and a fourth flow stage substantially reduce the aerodynamic noise of the fluid pressure reduction device.

6. The fluid pressure reduction device of claim 5, wherein the first flow stage and the second flow stage comprise passageways that define contraction-expansion pairs of a nozzle-type configuration.

7. The fluid pressure reduction device of claim 6, wherein the third flow stage and the fourth flow stage comprise passageways that are generally rectangular in shape.

8. The fluid pressure reduction device of claim 5, wherein the first and second flow stages are configured to provide a pressure-drop ratio of between range of 0.50 and 0.78.

9. The fluid pressure reduction device of claim 8, wherein the third and fourth flow stages are configured to provide a pressure-drop ratio of between 0.30 and 0.40.

10. A fluid pressure reduction device according to claim 1, wherein each plate includes mounting apertures located in the periphery of each plate and the device further includes a plurality of elongated fasteners each adapted to pass through a respective one of the mounting aperture in each of the annular plates for maintaining the stacked annular plates mounted together.

11. A fluid pressure reduction device according to claim 10, wherein each mounting aperture includes a fluid passageway in communication with the fluid flowing through the fluid pressure reduction device.

12. A fluid pressure reduction device comprising:

a plurality of stacked annular plates, each plate having a perimeter and a hollow center aligned along a longitudinal axis when the annular plates are stacked on top of one another, wherein each plate further comprises:

an inlet flow sector having an inlet flow stage comprising a fluid inlet slot partially extending from the hollow center towards the perimeter and a first plenum being radially adjacent to the fluid inlet slot and partially extending from the perimeter towards the hollow center, an outlet flow sector having an outlet flow stage comprising a fluid outlet slot partially extending from the perimeter towards the hollow center and a second plenum being radially adjacent to the fluid outlet slot and partially extending from the hollow center towards the perimeter, and mounting apertures spatially separated on each plate, each mounting aperture having a fluid passageway in communication with the fluid flowing through the fluid pressure reduction device.

13. A fluid pressure reduction device according to claim 12, wherein adjacent stacked annular plates are selectively positioned to enable fluid flow from the fluid inlet stage of a first plate into the second plenum of adjacent annular plates such that the fluid flow path is split into axial and radial flow directions, and then distributed through the first plenum of the first plate to the outlet slots of the adjacent annular plates.

14. A fluid pressure reduction device according to claim 13, wherein the device includes a plurality of elongated fasteners each adapted to pass through a respective one of the mounting aperture in each of the annular plates for maintaining the stacked annular plates mounted together.

15. The fluid pressure reduction device of claim 13, wherein each plate comprises a plurality of flow stages wherein a first flow stage provides fluid flow to a second flow stage, and the second flow provides fluid flow to a third flow providing fluid flow stage.

16. The fluid pressure reduction device of claim 15, wherein the third flow stage provides fluid flow to a fourth flow stage.

17. The fluid pressure reduction device of claim 16, wherein the fourth flow stage provides a backpressure sufficient to induce sub-sonic fluid flow at the perimeter.

* * * * *

UNITED STATES PATENT AND TRADEMARK OFFICE
CERTIFICATE OF CORRECTION

| | | |
|---|---|---|
| PATENT NO. | : 7,766,045 B2 | Page 1 of 1 |
| APPLICATION NO. | : 11/461218 | |
| DATED | : August 3, 2010 | |
| INVENTOR(S) | : Allen C. Fagerlund et al. | |

It is certified that error appears in the above-identified patent and that said Letters Patent is hereby corrected as shown below:

At Column 1, line 62, "can not" should be -- cannot --.

At Column 7, line 20, "stage" should be -- stages --.

At Column 7, line 63, "ar" should be -- art --.

At Column 9, line 15, "stages include" should be -- stage includes --.

Signed and Sealed this
Third Day of May, 2011

David J. Kappos
*Director of the United States Patent and Trademark Office*